US 6,588,795 B2

(12) United States Patent
Fischer et al.

(10) Patent No.: US 6,588,795 B2
(45) Date of Patent: Jul. 8, 2003

(54) AIR BAG MODULE WITH VENT

(75) Inventors: Kurt F. Fischer, Oxford, MI (US); Ernst M. Faigle, Dryden, MI (US)

(73) Assignee: TRW Vehicle Safety Systems Inc., Lyndhurst, OH (US)

( * ) Notice: Subject to any disclaimer, the term of this patent is extended or adjusted under 35 U.S.C. 154(b) by 53 days.

(21) Appl. No.: 09/757,758

(22) Filed: Jan. 10, 2001

(65) Prior Publication Data

US 2002/0089159 A1 Jul. 11, 2002

(51) Int. Cl.⁷ ................................................ B60R 21/26
(52) U.S. Cl. ...................................... 280/736; 280/742
(58) Field of Search ................................ 280/736, 739, 280/742, 741, 740

(56) References Cited

U.S. PATENT DOCUMENTS

| 3,788,596 | A | * | 1/1974 | Maeda | 251/69 |
| 5,161,776 | A | * | 11/1992 | Nicholson | 251/30.05 |
| 5,234,229 | A | | 8/1993 | Gordon | 280/736 |
| 5,366,242 | A | * | 11/1994 | Faigle et al. | 280/736 |
| 5,695,214 | A | | 12/1997 | Faigle et al. | 280/735 |
| 5,707,078 | A | * | 1/1998 | Swanberg et al. | 280/739 |
| 5,743,558 | A | * | 4/1998 | Seymour | 280/739 |
| 5,799,974 | A | | 9/1998 | Honda | 280/739 |
| 5,829,783 | A | * | 11/1998 | Ishikawa et al. | 280/736 |
| 5,853,192 | A | * | 12/1998 | Sikorski et al. | 280/739 |
| 6,017,056 | A | * | 1/2000 | Lee | 280/739 |
| 6,082,765 | A | | 7/2000 | Bowers et al. | 280/742 |
| 6,176,511 | B1 | * | 1/2001 | Adkisson et al. | 280/728.2 |
| 6,213,502 | B1 | * | 4/2001 | Ryan et al. | 280/736 |

* cited by examiner

Primary Examiner—Paul N. Dickson
Assistant Examiner—L. Lum
(74) Attorney, Agent, or Firm—Tarolli, Sundheim, Covell & Tummino L.L.P.

(57) ABSTRACT

A vehicle occupant protection apparatus (10) comprises an inflatable vehicle occupant protection device (12) having a deflated condition and an inflated condition for helping to protect a vehicle occupant. An inflator (14) is actuatable to provide inflation fluid to inflate the protection device (12). A retainer (40) is connected with the protection device (12). One of the inflator (14) and the retainer (40) is movable between a first condition blocking venting of inflation fluid from the apparatus (10) and a second condition venting inflation fluid from the apparatus. The apparatus (10) includes an electrically energizable mechanism (80) to release the one of the inflator (14) and the retainer (40) for movement from the first condition to the second condition to vent inflation fluid from the apparatus. The apparatus (10) also includes vehicle electric circuitry (90) including a sensor (92) for sensing at least one occupant condition or vehicle condition and a controller (100) responsive to the sensor for controlling the electrically energizable mechanism (80).

20 Claims, 7 Drawing Sheets

AIR BAG MODULE WITH VENT

BACKGROUND OF THE INVENTION

1. Technical Field

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the air bag.

2. Description of the Prior Art

It is known to inflate an air bag to help protect a vehicle occupant in the event of sudden deceleration such as occurs in a vehicle collision. The air bag is stored in a deflated condition, together with an inflator, in a housing adjacent to the vehicle seat in which the occupant sits. The inflator, when actuated, provides a large volume of inflation fluid to inflate the air bag into a position to help protect the vehicle occupant.

Under normal circumstances, substantially all of the inflation fluid from the inflator is directed into the air bag to inflate the air bag. In some circumstances, however, it may be desirable to control or limit the amount of inflation fluid directed into the air bag. For example, if the vehicle occupant is smaller than a predetermined size or is closer to the vehicle instrument panel than a predetermined distance, then it may be desirable to reduce the speed and force with which the air bag inflates. It is known to vent inflation fluid from the housing of an air bag module in such circumstances, so that less inflation fluid is directed into the air bag.

SUMMARY OF THE INVENTION

The present invention is a vehicle occupant protection apparatus comprising an inflatable vehicle occupant protection device having a deflated condition and an inflated condition for helping to protect a vehicle occupant. An inflator is actuatable to provide inflation fluid to inflate the inflatable device. A retainer is connected with the protection device. One of the inflator and the retainer is movable between a first condition blocking venting of inflation fluid from the apparatus and a second condition venting inflation fluid from the apparatus. The apparatus includes an electrically energizable mechanism to release the one of the inflator and the retainer for movement from the first condition to the second condition to vent inflation fluid from the apparatus. The apparatus also includes vehicle electric circuitry including a sensor for sensing at least one occupant condition or vehicle condition and a controller responsive to the sensor for controlling the electrically energizable mechanism.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DESCRIPTION OF EMBODIMENTS OF THE INVENTION

The present invention relates to a vehicle occupant protection apparatus including an inflatable vehicle occupant protection device, such as an air bag. In particular, the present invention relates to an air bag module in which inflation fluid is selectively vented from the module in order to control the speed and force of deployment of the inflating air bag.

Figure 1:
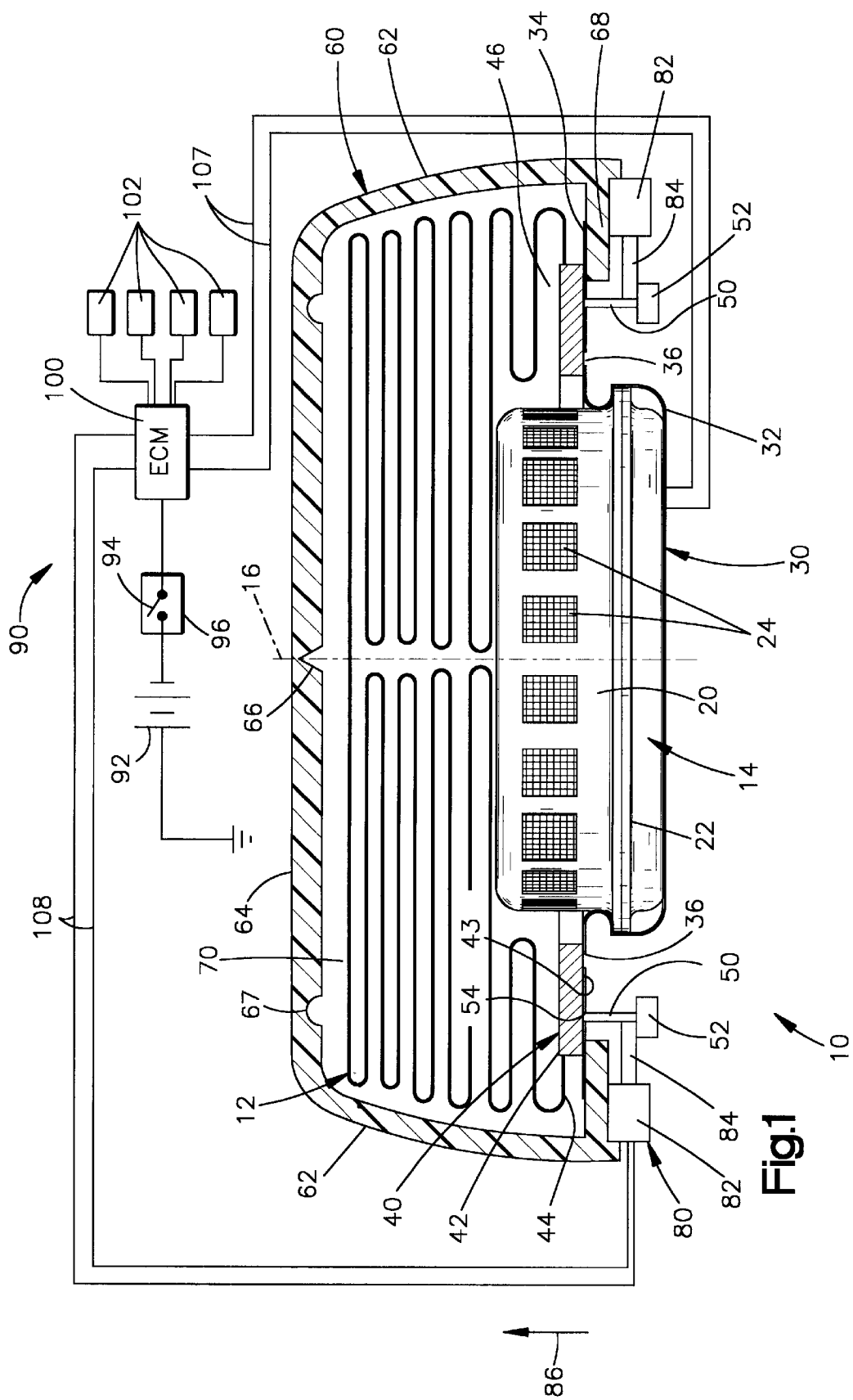
FIG. 1 is a schematic illustration, partially in section, of a vehicle occupant protection apparatus constructed in accordance with a first embodiment of the present invention.

As representative of the present invention, FIG. 1 illustrates a vehicle occupant protection apparatus 10 that is constructed in accordance with a first embodiment of the invention. The apparatus 10 includes an inflatable vehicle occupant protection device 12 of the type commonly known as an air bag. Other occupant protection devices that can be used in accordance with the invention include, for example, inflatable knee bolsters, inflatable headliners, inflatable side curtains, knee bolsters actuatable by air bags, and seat belt pretensioners.

The apparatus 10 also includes an inflator 14. The inflator 14 comprises a source of inflation fluid for inflating the air bag 12. As known in the art, the inflator 14 may contain an ignitable gas-generating material, which, when ignited, rapidly generates a large volume of gas. The inflator 14 may alternatively contain a stored quantity of pressurized inflation fluid, or a combination of pressurized inflation fluid and ignitable material for heating the inflation fluid.

The inflator 14 illustrated in the drawings has a cylindrical configuration centered on an axis 16. The inflator 14 could have a configuration other than the cylindrical configuration illustrated in the drawings. The inflator 14 has a main body portion 20 and an annular mounting flange 22. The main body portion 20 includes a plurality of inflation fluid outlets 24 through which inflation fluid is directed upon actuation of the inflator 14.

The apparatus 10 also includes a mounting plate shown schematically at 30. The mounting plate 30 is a structure that supports the inflator 14 and the air bag 12 on the vehicle. In the illustrated embodiment, the mounting plate 30 has a generally circular configuration. A central portion 32 of the mounting plate 30 extends around the main body portion 20 and mounting flange 22 of the inflator 14, and supports the inflator.

A peripheral portion 34 of the mounting plate 30 extends radially outward from the central portion 32 and has a generally planar configuration. The peripheral portion 34 of the mounting plate 30 is secured to the vehicle in a manner not shown, and thus supports the inflator 14 on the vehicle. The peripheral portion 34 of the mounting plate 30 has at least one, and preferably a plurality of, vent openings 36. The vent openings 36 are located radially outward of the main body portion 20 of the inflator 14.

The apparatus 10 includes a retainer 40 that is supported on the mounting plate 30. The retainer 40 is a device that is connected with the air bag 12 and that retains, or secures, the air bag in the apparatus 10. The retainer 40 has a body portion 42 with a ring-like configuration extending around the main body portion 20 of the inflator 14. The body portion 42 of the retainer 40 has an annular inner major side surface 43 presented toward the mounting plate 30. A mouth portion 44 of the air bag 12 is secured to the body portion 42 of the retainer 40. The mouth portion 44 of the air bag 12 defines an inflation fluid opening 46 of the air bag, for receiving inflation fluid from the inflator 14.

The retainer 40 includes structure for movably connecting the retainer with the mounting plate 30. In the illustrated embodiment, the structure comprises two support posts 50, although a different number of support posts, or a different type of structure, could be provided. The two support posts 50 in the illustrated embodiment are identical, and so are given the same reference numerals.

The support posts 50 are disposed diametrically opposite each other about the axis 16. The support posts 50 extend axially from the inner major side surface 43 of the body portion 42 of the retainer 40. Each one of the support posts 50 terminates in a circular stop 52. Each one of the support posts 50 extends through a respective opening 54 in the peripheral portion 34 of the mounting plate 30.

The support posts 50 of the retainer 40 are movable axially in the openings 54 in the mounting plate 30. As a result, the retainer 40 is supported for sliding movement relative to the mounting plate 30, in a direction parallel to the axis 16. Because the mouth portion 44 of the air bag 12 is secured to the body portion 42 of the retainer 40, the mouth portion of the air bag is also supported for sliding movement relative to the mounting plate 30.

The inflator 14, the air bag 12, and the retainer 40 are, in the illustrated embodiment, enclosed in a cover 60. The cover 60 is preferably made from plastic and includes a circular side wall 62 and a top wall 64. The top wall 64 has a predetermined weakened portion or tear seam 66. The top wall 64 is hinged to the side wall 62 at predetermined weakened portions 67. A mounting flange 68 of the cover 60 extends inwardly from the side wall 62 at a location spaced from the top wall 64 and is secured to the mounting plate 30. The top wall 64 and side wall 62 of the cover 60, together with the mounting plate 30 and the inflator 14, define a chamber 70 in the apparatus 10. The inflation fluid outlets 24 of the inflator 14 are located in the chamber 70.

The apparatus 10 includes a release mechanism 80 for controlling the axial movement of the retainer 40 relative to the mounting plate 30. In the illustrated embodiment, the release mechanism 80 includes two solenoids indicated schematically at 82, although more or fewer solenoids could be provided or a different type of mechanism could be provided. The solenoids 82 in the illustrated embodiment are identical to each other.

Each one of the solenoids 82 includes an actuator rod 84, or similar structure, that extends in a direction perpendicular to the axis 16. When the solenoid 82 is in an unactuated condition as shown in FIG. 1, the actuator rod 84 is in engagement with the stop 52 of one of the support posts 50 of the retainer 40. The engagement of the actuator rod 84 with the stop 52 prevents the support post 50 from moving axially in a first direction 86 toward the top wall 64 of the cover 60, that is, in an upward direction as viewed in FIG. 1.

When the release mechanism 80 is in the unactuated condition, the body portion 42 of the retainer 40 covers the vent openings 36 in the mounting plate 30. Because the two support posts 50 are fixed for movement with the body portion 42 of the retainer 40, the body portion of the retainer is blocked from movement in the direction 86 when the release mechanism 80 is in the unactuated condition. Because the mouth portion 44 of the air bag 12 is fixed for movement with the body portion 42 of the retainer 40, the mouth portion of the air bag is also blocked from movement in the direction 86.

The apparatus 10 includes vehicle electric circuitry indicated schematically at 90 (FIG. 1). The vehicle electric circuitry 90 controls the operation of the inflator 14 and the release mechanism 80. The vehicle electric circuitry 90 includes a power source 92, which is preferably the vehicle battery and/or a capacitor, and a normally open switch 94. The switch 94 is part of a collision sensor 96, which senses a condition indicating the occurrence of a vehicle collision. The collision-indicating condition may comprise, for example, sudden vehicle deceleration caused by a collision. The vehicle electric circuitry 90 further includes a controller, or control module, 100 for controlling the operation of the vehicle electric circuitry 90, and a sensor assembly 102.

The sensor assembly 102 includes one or more sensors that generate one or more control signals useful in determining whether to inflate the air bag 12 with maximum speed and force when a vehicle collision is sensed. For example, the sensor assembly 102 may include an occupant position sensor that generates a control signal indicative of the position of a vehicle occupant in the interior of a vehicle. The sensor assembly 102 may also include a buckle switch for generating a control signal indicative of a buckled or unbuckled condition of a seat buckle assembly of the vehicle. The sensor assembly 102 may also include a sensor that senses the presence of a rearward-facing child seat, a weight sensor, a belt tension sensor, an occupant size sensor, a module temperature sensor, or a crash severity sensor.

If a collision-indicating condition sensed by the collision sensor 96 is above a predetermined threshold, it indicates the occurrence of a collision for which inflation of the air bag 12 is desired to help protect the occupant of the vehicle. The switch 94 in the collision sensor 96 closes and the control module 100 transmits an actuation signal to the inflator 14 over lead wires 107. When the inflator 14 is actuated, it emits a large volume of inflation fluid into the chamber 70.

Figure 2:
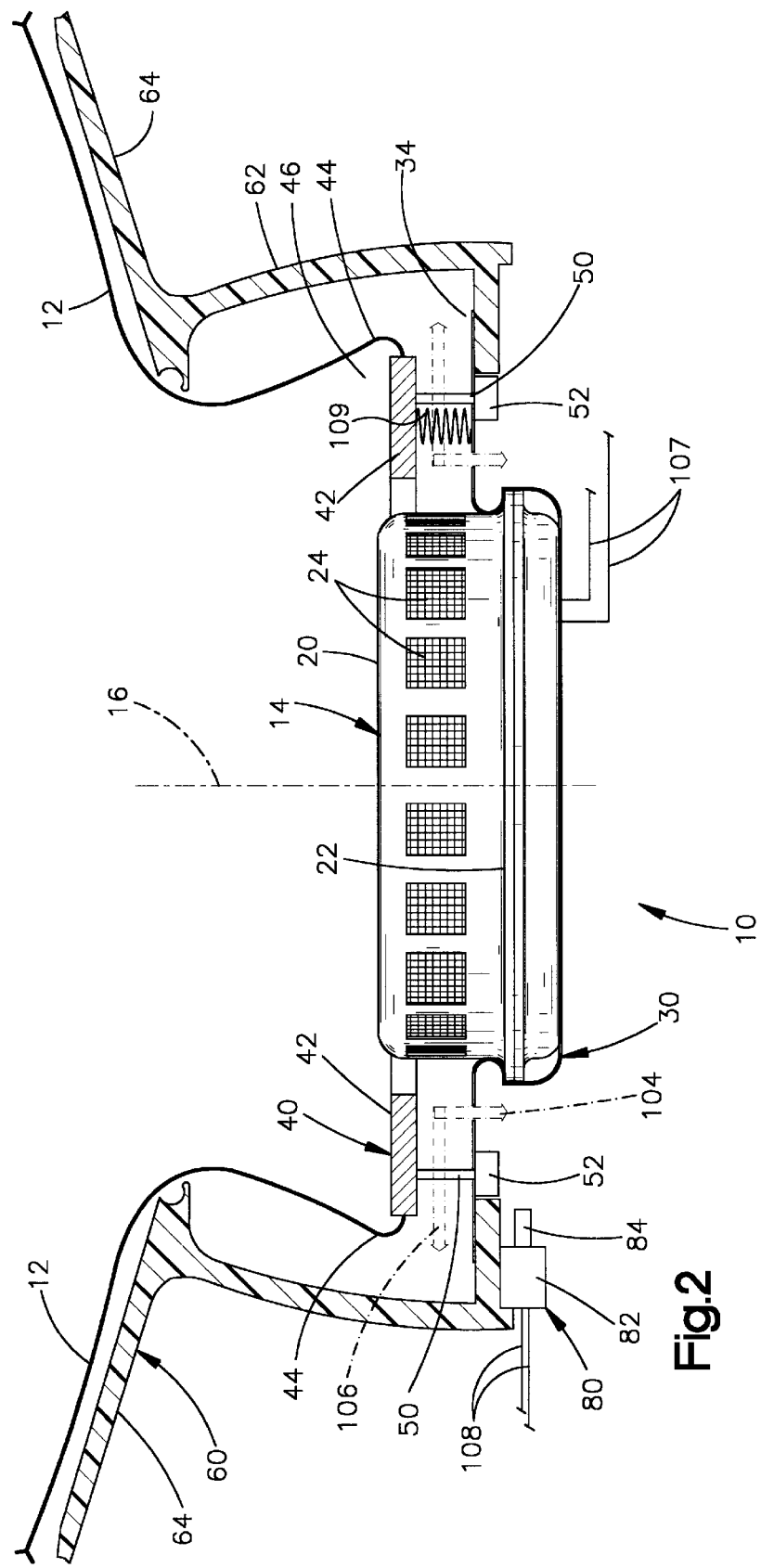
FIG. 2 is an illustration similar to FIG. 1 showing the apparatus of FIG. 1 in an actuated condition.

The inflation fluid flows into the inflation fluid opening 46 of the air bag 12. The inflation fluid begins to inflate the air bag 12, which moves rapidly and forcefully outward against the top wall 64 of the cover 60. The cover 60 opens and the air bag 12 inflates into a position to help protect the vehicle occupant, as shown in FIG. 2.

Upon such an occurrence of a condition requiring actuation of the inflator 14, the control module 100 receives the control signals from the sensor assembly 102. The control module 100 determines, on the basis of those signals, whether it is desirable to actuate the release mechanism 80. This determination, as well as the actuating of the release mechanism 80 itself, can be made prior to actuation of the inflator 14, or at the same time as actuation of the inflator, or after actuation of the inflator.

The control signals from the sensor assembly 102 may indicate a condition in which it is desirable that the air bag 12 be inflated with maximum force and speed. If the control module 100 receives signals indicating such a condition, the control module determines that the release mechanism 80 should remain in the unactuated condition. The solenoids 82 are not energized by the control module 80. The actuator rods 84 remain in engagement with the stops 52 of the support posts 50. The retainer 40 is not released for movement away from the mounting plate 30. The vent openings 36 in the mounting plate 30 remain covered by the body portion 42 of the retainer 40. As a result, all the inflation fluid from the inflator 14 is directed into the inflation fluid opening 46 of the air bag 12, and the air bag inflates with maximum speed and force.

On the other hand, one or more of the control signals from the sensor mechanism 102 may indicate a condition in which it is desirable not to inflate the air bag 12 with maximum speed and force. If the control module 100 receives a signal indicative of such a condition, the control module determines that the release mechanism 80 should be actuated. A control signal is transmitted from the control module 100, through lead wires 108, to the solenoids 82 of the release mechanism 80. The solenoids 82 are electrically energized and cause the rods 84 to move from the unactuated position shown in FIG. 1 to a second, or actuated, position shown in FIG. 2.

When the actuator rods 84 move from the first position into the second position, the actuator rods move out of engagement with the stops 52 of the support posts 50. The retainer 40 is released for movement away from the mounting plate 30. The force of the inflating air bag 12, which is moving away from the mounting plate 30, acts through the mouth portion 44 of the air bag 12 and pulls the retainer 40 away from the mounting plate 30. The body portion 42 of the retainer 40 moves away from, and uncovers, the vent openings 36 in the mounting plate 30.

The uncovering of the vent openings 36 enables inflation fluid from the inflator 14 to flow out of the air bag 12 and the chamber 70 through the vent openings, as indicated by the arrows 104. Inflation fluid from the inflator can also flow through the space between the mounting plate 30 and the retainer 40, as indicated by the arrows 106.

The inflation fluid that flows out of the chamber 70 through the vent openings 36, and through the space between the mounting plate 30 and the retainer 40, does not flow into the air bag 12 to inflate the air bag. As a result, the amount of inflation fluid flowing into the air bag 12, or the pressure of the inflation fluid, is reduced as compared to the amount or pressure of inflation fluid flowing into the air bag when the release mechanism 80 remains unactuated. This change in the flow of inflation fluid can help to reduce or control the speed and force of deployment of the air bag 12.

The apparatus 10 may include structure for helping to move the retainer 40 away from the mounting plate 30 when the release mechanism 80 is actuated. For example, the apparatus 10 may include one or more springs located between the retainer 40 and the mounting plate 30, as indicated schematically at 109 (FIG. 2). The springs 109 can help to move the retainer 40 away from the mounting plate 30 when the release mechanism 80 is actuated.

Figure 3:
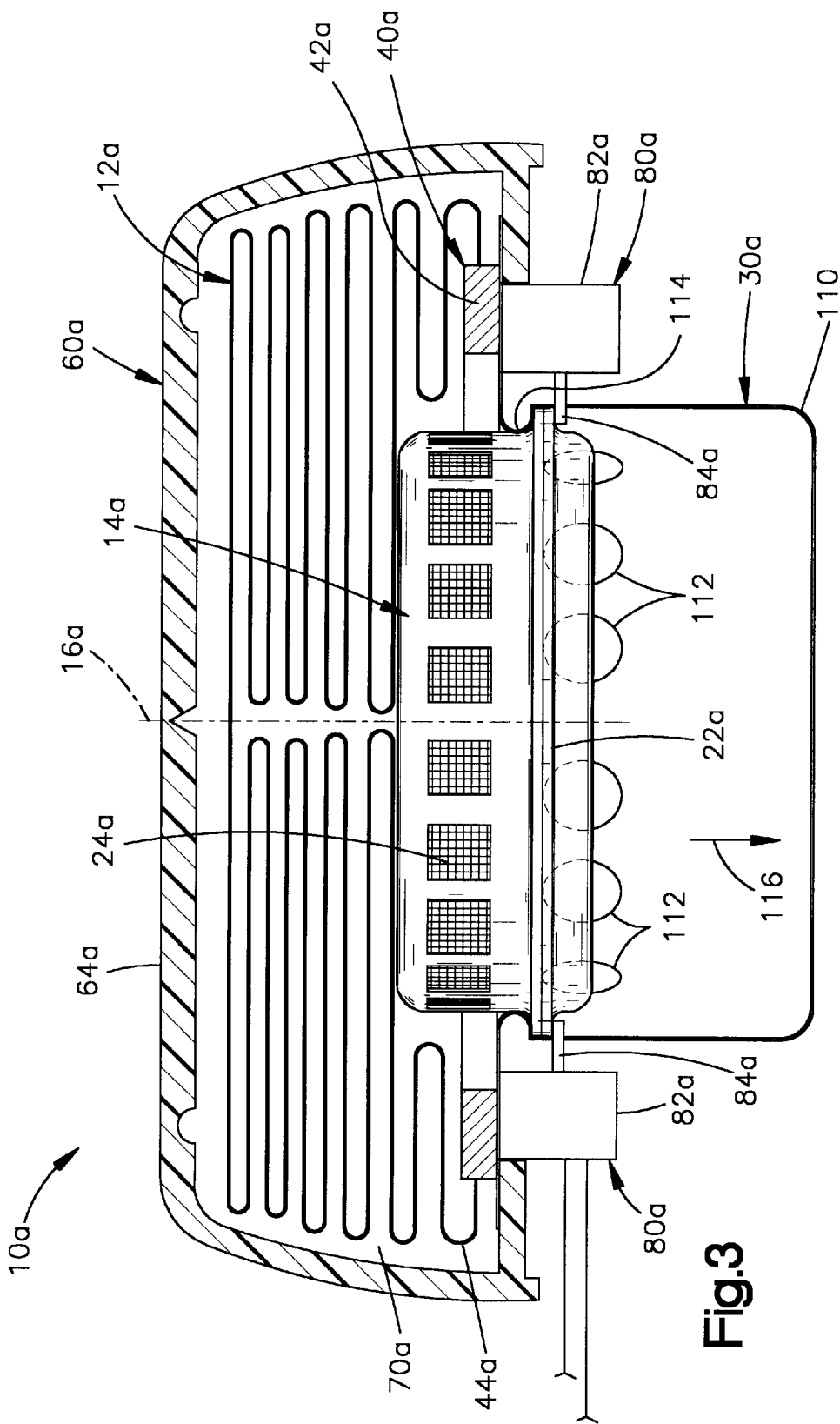
FIG. 3 is a view similar to FIG. 1 showing a vehicle occupant protection apparatus constructed in accordance with a second embodiment of the present invention.
Figure 4:
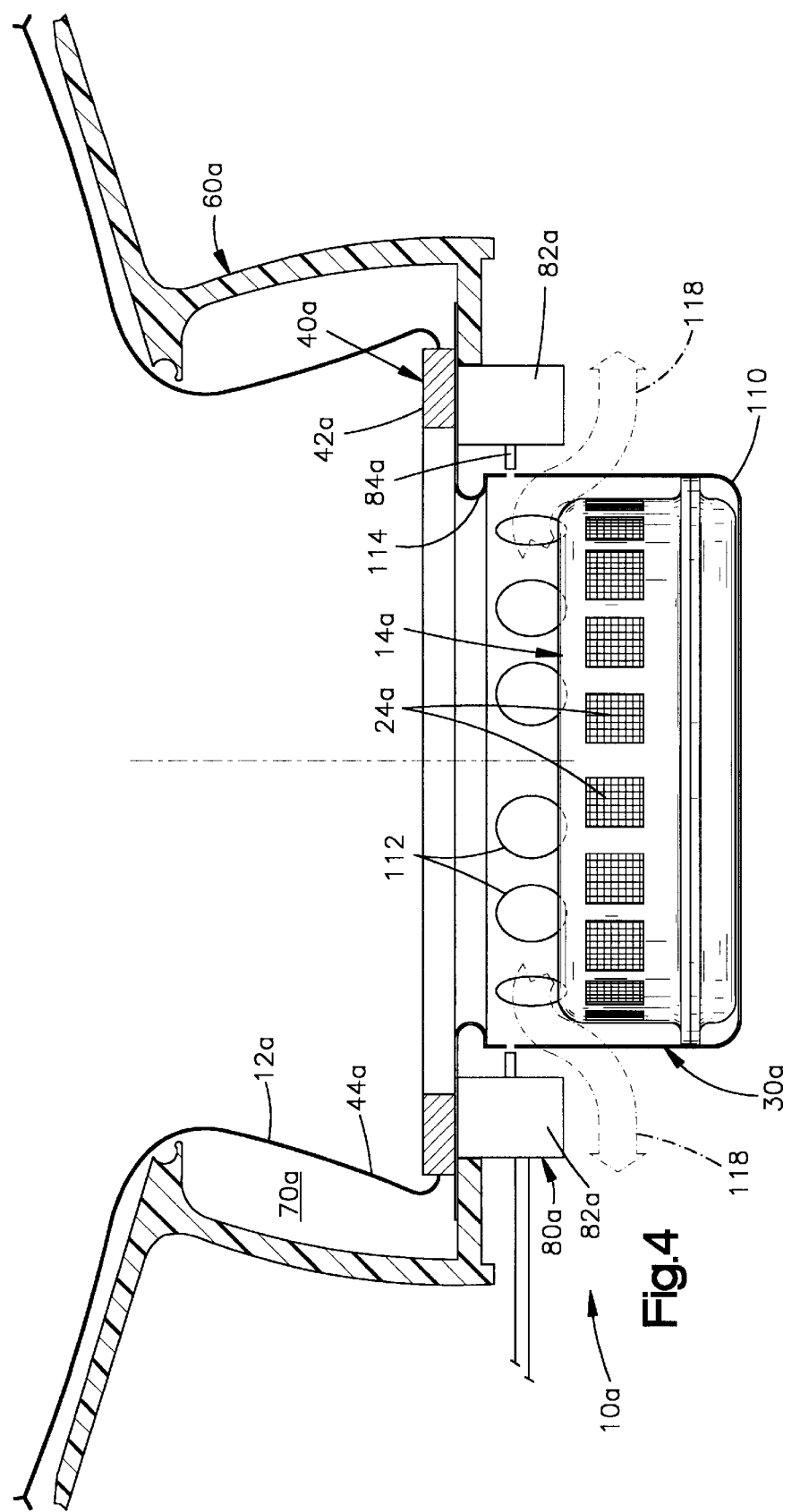
FIG. 4 is an illustration similar to FIG. 3 showing the apparatus of FIG. 3 in an actuated condition.

FIGS. 3 and 4 illustrate a vehicle occupant protection apparatus 10a constructed in accordance with a second embodiment of the invention. Many parts of the apparatus 10a are similar in construction to parts of the apparatus 10 (FIGS. 1–2). Parts of the apparatus 10a that are the same as, or similar to, parts of the apparatus 10 are given the same reference numerals with the suffix "a" attached.

In the apparatus 10a, the retainer 40a is fixed in position on the mounting plate 30a. The mounting plate 30a has a lower portion 110 that projects below the inflator 14a, that is, in a direction away from the air bag 12a. The mounting plate 30a and cover 60a define a chamber 70a within which are located the inflator 14a and air bag 12a. The lower portion 110 of the mounting plate 14a has a circular array of vent openings 112. The inflator 14a is located in an upper portion 114 of the mounting plate 14a, and is selectively movable, as described below, from the upper portion of the mounting plate to the lower portion 110.

The apparatus 10a includes a release mechanism 80a for controlling the axial movement of the inflator 14a relative to the mounting plate 30a. In the illustrated embodiment, the release mechanism 80a includes two solenoids indicated schematically at 82a. Additional solenoids or only one solenoid may be provided.

Each solenoid 82a includes an actuator rod 84a, or similar structure, that extends in a direction perpendicular to the axis 16a. When the solenoid 82a is in a first, or unactuated, condition as shown in FIG. 3, the actuator rod 84a is in engagement with a portion of the inflator 14a, in this case, the mounting flange 22a. The engagement of the actuator rod 84a with the inflator 14a prevents the inflator from moving axially in a second direction 116, away from the top wall 64a of the cover 60a and toward the lower portion 110 of the mounting plate 30, that is, in a downward direction as viewed in FIG. 3.

When the release mechanism 80a is in the unactuated condition, the inflator 14a is in abutting engagement with the upper portion 114 of the mounting plate 30. The inflation fluid outlets 24a of the inflator 14a are located within the mouth portion 44a of the air bag 12a.

The apparatus 10a includes vehicle electric circuitry for actuating the inflator and the release mechanism, which may be the vehicle electric circuitry 90. If the inflator 14a is actuated and the vehicle electric circuitry 90 determines that that the release mechanism 80a should not be actuated, the solenoids 82a are not electrically energized. The actuator rods 84a remain in engagement with the mounting flange 22a of the inflator 14a. The inflator remains in the unactuated position shown in FIG. 3. All the inflation fluid from the inflator 14a flows into the mouth portion 44a of the air bag 12a to inflate the air bag.

If the inflator 14a is actuated and the vehicle electric circuitry 90, in a manner as described above with reference to FIGS. 1 and 2, determines that the release mechanism 80a should be actuated, the solenoids 82a are electrically energized. The actuator rods 84a move from the unactuated condition shown in FIG. 3 to a second, or actuated, condition shown in FIG. 4.

When the actuator rods 84a move from the first position into the second position, the actuator rods move out of engagement with the mounting flange 22a of the inflator 14a. The inflator 14a is released for movement away from the air bag 12a. The inflator 14a moves from the upper portion 114 of the mounting plate 30a into the lower portion 110 of the mounting plate, as shown in FIG. 4. The motive force for this movement may come from the increase in fluid pressure in the chamber 70a above the inflator 14a, from gravity, from crash momentum, or from one or more springs.

As the inflator 14a moves into the position shown in FIG. 4, fluid communication is established between the inflation fluid outlets 24a of the inflator and the vent openings 112 in the mounting plate 30a. This enables inflation fluid from the inflator 14a to flow out of the chamber 70a through the vent openings 112, as indicated by the arrows 118 (FIG. 4). The inflation fluid that flows out of the chamber 70a through the vent openings 112 does not flow into the air bag 12a to inflate the air bag. As a result, the amount of inflation fluid flowing into the air bag 12a, or the pressure of the inflation fluid, is reduced as compared to the amount or pressure of inflation fluid flowing into the air bag when the release mechanism 80*a* remains unactuated. This change in the flow of inflation fluid can help to reduce or control the speed and force of deployment of the air bag 12*a*.

Figure 5:
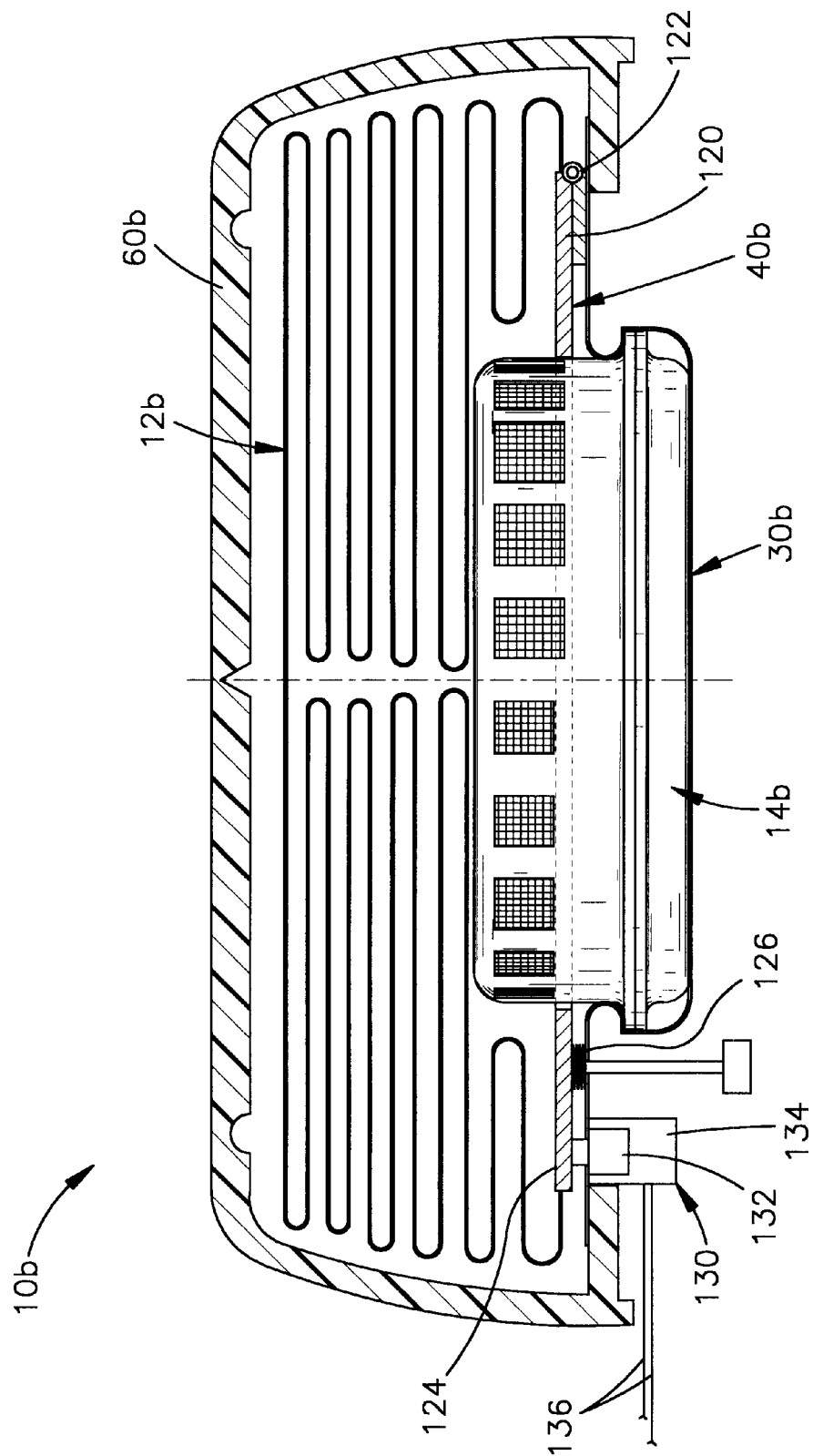
FIG. 5 is a view similar to FIG. 1 showing a vehicle occupant protection apparatus constructed in accordance with a third embodiment of the present invention.
Figure 6:
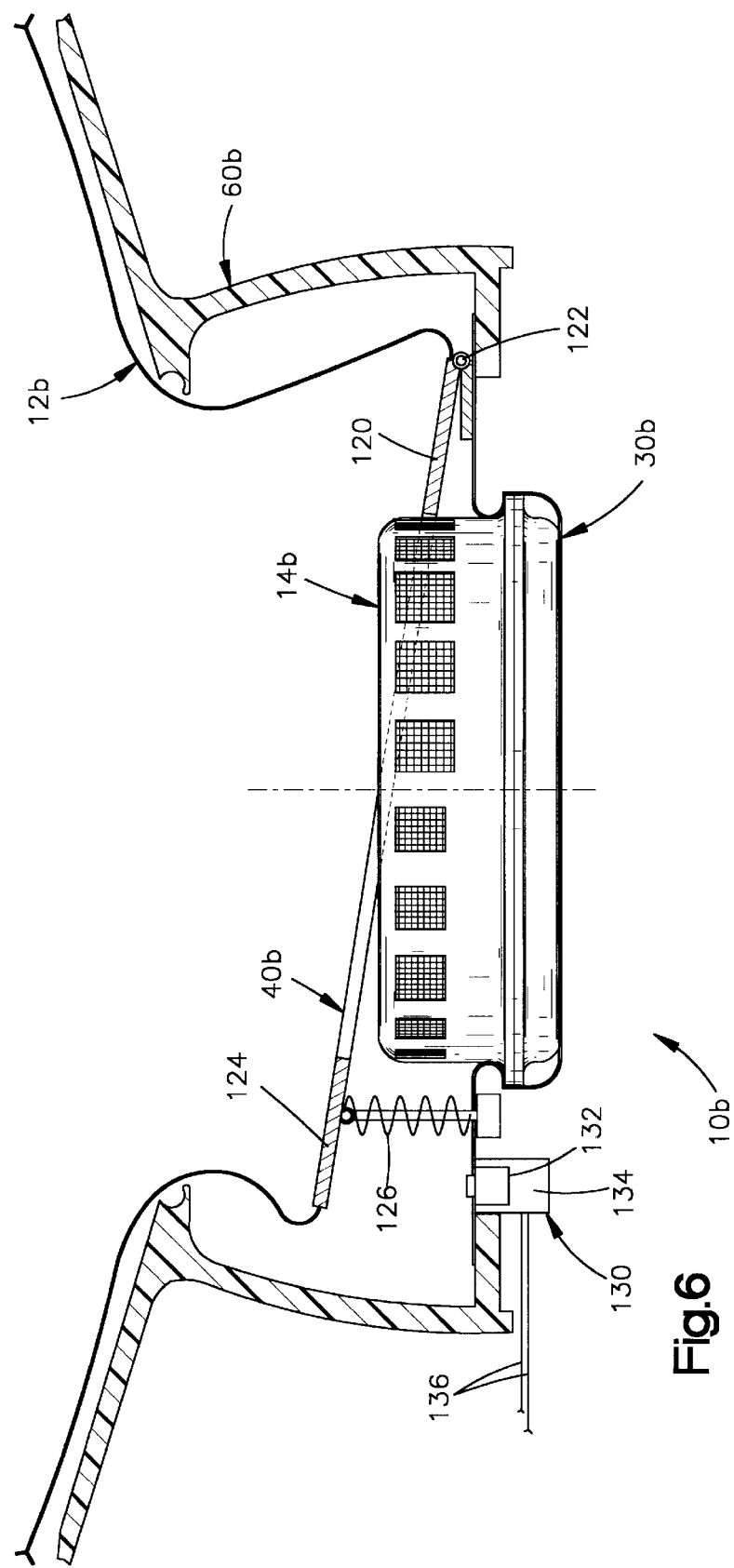
FIG. 6 is an illustration similar to FIG. 5 showing the apparatus of FIG. 5 in an actuated condition.

FIGS. 5 and 6 illustrate a vehicle occupant protection apparatus 10*b* constructed in accordance with a third embodiment of the invention. Many parts of the apparatus 10*b* are similar in construction to parts of the apparatus 10 (FIGS. 1–2). Parts of the apparatus 10*b* that are the same as, or similar to, parts of the apparatus 10 are given the same reference numerals with the suffix "b" attached.

In the apparatus 10*b*, a retainer 40*b* is hingedly supported on a mounting plate 30*b*. Specifically, one side portion 120 of the retainer 40*b* is connected by a hinge 122 to the mounting plate 30*b*. The opposite side portion 124 of the retainer 40*b* is movable relative to the mounting plate 30*b*.

A spring 126 acts between the mounting plate 30*b* and the movable portion 124 of the retainer 40*b*. The spring 126 urges the movable portion 124 of the retainer 40*b* away from the mounting plate 30*b*.

The apparatus 10*b* includes a release mechanism 130 that releasably secures the movable portion 124 of the retainer 40*b* to the mounting plate 30*b*. Different types of release mechanisms could be used. In the illustrated embodiment, the release mechanism 130 includes a permanent magnet 132 and an electromagnet 134.

The permanent magnet 132 generates a magnetic force that normally holds the movable portion 124 of the retainer 40*b* in engagement with the mounting plate 30*b*. The electromagnet 134 is located adjacent to the permanent magnet 132. The electromagnet 134 is electrically energizable to generate a magnetic force that acts in opposition to the magnetic force applied by the permanent magnet 132. The electromagnet 134 is connected by lead wires 136 to the controller (not shown) for the apparatus 10*b*.

When the retainer 40*b* is in the position shown in FIG. 5, and the inflator 14*b* is actuated, all the inflation fluid from the inflator flows into the air bag 12*b*. The air bag 12*b* is inflated with maximum speed and force.

When the release mechanism 130 is actuated to cause venting of inflation fluid, the electromagnet 134 is energized. The electromagnet 134 generates a magnetic force that acts in opposition to the magnetic force applied by the permanent magnet 132. The magnetic force of the permanent magnet 132, which acts against the biasing force of the spring 126, is overcome, and the biasing force of the spring moves the side portion 124 of the retainer 40*b* away from the mounting plate 30*b*. Inflation fluid can vent from the apparatus 10*b*, either through openings in the mounting plate 30*b*, or between the mounting plate 30*b* and the retainer 40*b*.

Figure 7:
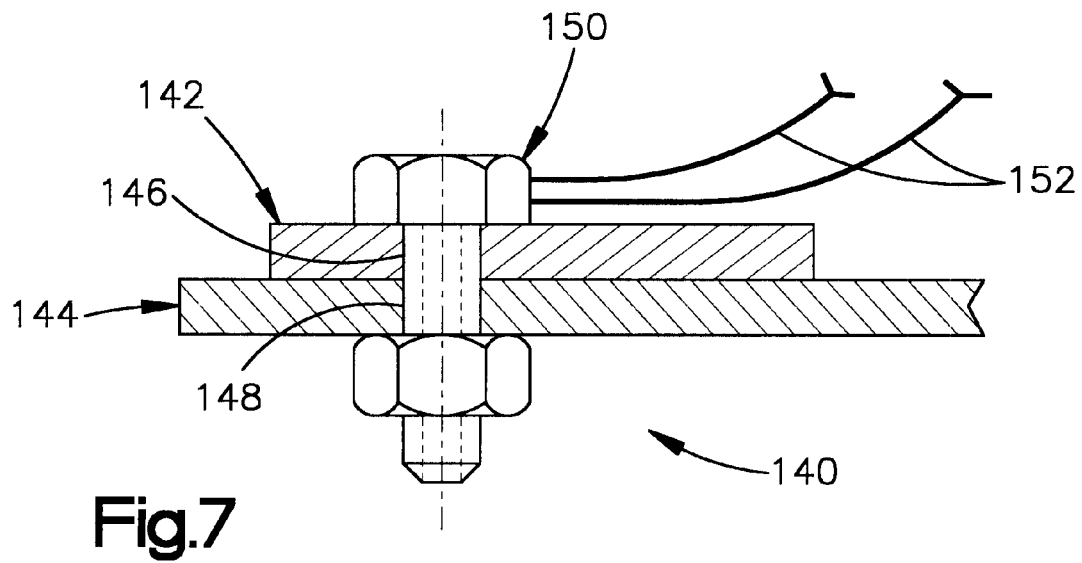
FIG. 7 is a view of a release mechanism that can be used in an apparatus in accordance with the present invention.

FIG. 7 illustrates a portion of an alternative release mechanism 140 that can be used in a vehicle occupant protection apparatus constructed in accordance with the invention. As a part of the release mechanism 140, a retainer 142 and a mounting plate 144 have aligned fastener openings 146 and 148, respectively. An explosive bolt 150 extends through the fastener openings 146 and 148. The explosive bolt 150 secures the retainer 142 to the mounting plate 144.

When the release mechanism 140 is actuated by an electric signal over lead wires 152, the explosive bolt 150 fractures. As a result, the bolt 150 no longer secures the retainer 142 to the mounting plate 144. The retainer 142 is free to move away from the mounting plate 144, under the influence of a spring (not shown), or under the influence of the force of an inflating air bag. The movement of the retainer 142 enables at least some inflation fluid to be vented from the apparatus rather than being directed into the air bag.

Figure 8:
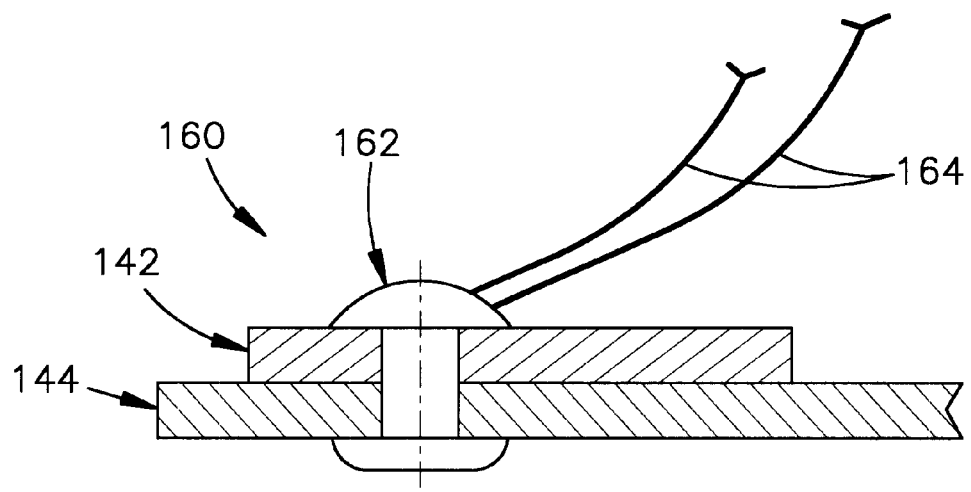
FIG. 8 is a view of another release mechanism that can be used in an apparatus in accordance with the present invention.

FIG. 8 illustrates a portion of an alternative release mechanism 160 that can be used in a vehicle occupant protection apparatus constructed in accordance with the invention. The release mechanism 160 is similar in construction to the release mechanism 140 (FIG. 7) with the exception that the release mechanism 160 uses an explosive rivet 162 rather than an explosive bolt 150. The explosive rivet 160 secures the retainer 142 to the mounting plate 144.

When the release mechanism 160 is actuated by an electric signal over lead wires 164, the explosive rivet 162 fractures. As a result, the rivet 162 no longer secures the retainer 142 to the mounting plate 144. The retainer 142 is free to move away from the mounting plate 144, under the influence of a spring (not shown), or under the influence of the force of an inflating air bag. The movement of the retainer 142 enables at least some inflation fluid to be vented from the apparatus rather than being directed into the air bag.

From the above description of the invention, those skilled in the art will perceive improvements, changes and modifications in the invention. Such improvements, changes and modifications within the skill of the art are intended to be covered by the appended claims. said one of said inflator and said retainer that is movable is said retainer.

Having described the invention, we claim:

1. A vehicle occupant protection apparatus comprising:
   an inflatable vehicle occupant protection device having a deflated condition and an inflated condition for helping to protect a vehicle occupant;
   an inflator actuatable to provide inflation fluid to inflate said inflatable vehicle occupant protection device;
   a retainer connected with said inflatable vehicle occupant protection device for retaining said inflatable vehicle occupant protection device in said apparatus;
   one of said inflator and said retainer being movable between a first condition blocking venting of inflation fluid from said apparatus and a second condition venting inflation fluid from said apparatus;
   an electrically energizable mechanism to release said one of said inflator and said retainer for movement from the first condition to the second condition to vent inflation fluid from said apparatus; and
   vehicle electric circuitry including a sensor for sensing at least one occupant condition or vehicle condition and a controller responsive to said sensor for controlling said electrically energizable mechanism.

2. An apparatus as set forth in claim 1 wherein said one of said inflator and said retainer that is moveable is said retainer.

3. An apparatus as set forth in claim 2 wherein said retainer has support portions between which inflation fluid can flow when said retainer is in the second condition.

4. An apparatus as set forth in claim 2 wherein said retainer is supported for movement between the first and second conditions in response to force applied to said retainer by said protection device when said protection device is inflating.

5. An apparatus as set forth in claim 1 wherein said release mechanism comprises a solenoid.

6. An apparatus as set forth in claim 1 wherein said one of said inflator and said retainer is supported for movement between the first and second conditions in response to force applied by a spring.

7. An apparatus as set forth in claim 1 comprising a mounting plate, said inflator and said retainer being supported on said mounting plate, said one of said inflator and said retainer being movable relative to said mounting plate between the first condition and the second condition.

8. An apparatus as set forth in claim 7 wherein said mounting plate has a vent opening for venting inflation fluid when said one of said inflator and said retainer is in the second condition.

9. An apparatus as set forth in claim 1 wherein said at least one sensor is an occupant position sensor or a buckle switch or a sensor that senses the presence of a rearward-facing child seat or a weight sensor or a belt tension sensor or an occupant size sensor or a module temperature sensor or a crash severity sensor.

10. An apparatus as set forth in claim 1 wherein release mechanism comprises an explosive bolt.

11. An apparatus as set forth in claim 1 wherein release mechanism comprises an explosive rivet.

12. An apparatus as set forth in claim 1 wherein release mechanism comprises a magnetic catch mechanism.

13. Apparatus as set forth in claim 1 wherein said one of said inflator and said retainer is movable from the first condition to the second condition in response to force applied by a source other than said electrically energizable mechanism.

14. A vehicle occupant protection apparatus comprising:
an inflatable vehicle occupant protection device having a deflated condition and an inflated condition for helping to protect a vehicle occupant;
an inflator actuatable to provide inflation fluid to inflate said inflatable vehicle occupant protection device;
a retainer connected with said inflatable vehicle occupant protection device for retaining said inflatable vehicle occupant protection device in said apparatus;
one of said inflator and said retainer being movable between a first condition blocking venting of inflation fluid from said apparatus and a second condition venting inflation fluid from said apparatus;
an electrically energizable mechanism to release said one of said inflator and said retainer for movement from the first condition to the second condition to vent inflation fluid from said apparatus; and
vehicle electric circuitry including a sensor for sensing at least one occupant condition or vehicle condition and a controller responsive to said sensor for controlling said electrically energizable mechanism;
wherein said electrically energizable mechanism has a first state in which it holds said one of said inflator and said retainer against movement from the first condition to the second condition thereby to block venting of inflation fluid from said apparatus,
said mechanism being electrically energizable from the first state to a second state to release said one of said inflator and said retainer for movement from the first condition to the second condition to vent inflation fluid from said apparatus.

15. Apparatus as set forth in claim 14 wherein said one of said inflator and said retainer that is movable is said retainer.

16. An apparatus as set forth in claim 15 wherein said retainer is supported for movement between the first and second conditions in response to force applied to said retainer by said inflatable vehicle occupant protection device when said inflatable vehicle occupant protection device is inflating.

17. Apparatus as set forth in claim 14 wherein said one of said inflator and said retainer that is movable is said inflator.

18. Apparatus as set forth in claim 14 wherein said one of said inflator and said retainer is movable from the first condition to the second condition in response to force applied by a source other than said electrically energizable mechanism.

19. A vehicle occupant protection apparatus comprising:
an inflatable vehicle occupant protection device having a deflated condition and an inflated condition for helping to protect a vehicle occupant;
an inflator actuatable to provide inflation fluid to inflate said inflatable vehicle occupant protection device;
a retainer connected with said inflatable vehicle occupant protection device;
one of said inflator and said retainer being movable between a first condition blocking venting of inflation fluid from said apparatus and a second condition venting inflation fluid from said apparatus;
an electrically energizable mechanism to release said one of said inflator and said retainer for movement from the first condition to the second condition to vent inflation fluid from said apparatus; and
vehicle electric circuitry including a sensor for sensing at least one occupant condition or vehicle condition and a controller responsive to said sensor for controlling said electrically energizable mechanism,
wherein said one of said inflator and said retainer that is movable is said inflator.

20. A vehicle occupant protection apparatus comprising:
an inflatable vehicle occupant protection device having a deflated condition and an inflated condition for helping to protect a vehicle occupant;
an inflator actuatable to provide inflation fluid to inflate said inflatable vehicle occupant protection device;
a retainer connected with said inflatable vehicle occupant protection device for retaining said inflatable vehicle occupant protection device in said apparatus;
one of said inflator and said retainer being movable, due to inflation fluid flow into said inflatable vehicle occupant protection device, between a first condition blocking venting of inflation fluid from said apparatus and a second condition venting inflation fluid from said apparatus;
an electrically energizable mechanism to release said one of said inflator and said retainer for movement from the first condition to the second condition to vent inflation fluid from said apparatus; and
vehicle electric circuitry including a sensor for sensing at least one occupant condition or vehicle condition and a controller responsive to said sensor for controlling said electrically energizable mechanism.

* * * * *